United States Patent
Susairaj et al.

(10) Patent No.: US 12,001,406 B2
(45) Date of Patent: Jun. 4, 2024

(54) METHOD AND SYSTEM TO IMPLEMENT DIRECTORY READS FOR A DATABASE FILE SYSTEM

(71) Applicant: Oracle International Corporation, Redwood Shores, CA (US)

(72) Inventors: Margaret Susairaj, Sugar Land, TX (US); Jose Antonio Lasa Gutierrez, Zapopan (MX); Sumanta Chatterjee, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/877,689

(22) Filed: Jul. 29, 2022

(65) Prior Publication Data

US 2024/0037074 A1 Feb. 1, 2024

(51) Int. Cl.
| G06F 17/00 | (2019.01) |
| G06F 7/00 | (2006.01) |
| G06F 16/172 | (2019.01) |
| G06F 16/185 | (2019.01) |

(52) U.S. Cl.
CPC .......... *G06F 16/185* (2019.01); *G06F 16/172* (2019.01)

(58) Field of Classification Search
CPC .............................. G06F 16/185; G06F 16/172
USPC ........................................................ 707/829
See application file for complete search history.

(56) References Cited

U.S. PATENT DOCUMENTS

| 6,108,409 A * | 8/2000 | Cooper | H04Q 3/0029 379/279 |
| 7,028,037 B1 * | 4/2006 | Agarwal | G06F 16/86 707/999.1 |
| 8,239,486 B2 | 8/2012 | Susairaj et al. | |
| 9,881,170 B2 | 1/2018 | Morris | |
| 10,509,773 B2 | 12/2019 | Morris | |
| 2003/0033285 A1 * | 2/2003 | Jalali | G06F 16/284 707/999.001 |
| 2003/0037069 A1 * | 2/2003 | Davison | G06F 40/166 707/E17.117 |
| 2003/0065659 A1 * | 4/2003 | Agarwal | G06F 16/284 707/999.004 |
| 2004/0148308 A1 * | 7/2004 | Rajan | G06F 16/284 707/999.102 |
| 2005/0187893 A1 * | 8/2005 | Ashwin | G06F 16/24562 707/999.001 |
| 2006/0075006 A1 * | 4/2006 | Yu | G06F 16/2219 707/999.205 |
| 2006/0167931 A1 * | 7/2006 | Bobick | G06N 5/022 707/999.102 |
| 2006/0173865 A1 * | 8/2006 | Fong | G06F 40/151 707/999.1 |

(Continued)

OTHER PUBLICATIONS

Huan, Z,. "Question on readdir implementation", dated Sep. 16, 2009, URL: https://lists.openwall.net/linux-ext4/2009/09/16/5.

(Continued)

*Primary Examiner* — Pavan Mamillapalli
(74) *Attorney, Agent, or Firm* — Vista IP Law Group, LLP

(57) ABSTRACT

Disclosed is an improved approach to access the contents of database file system. The contents of the database file system can be acquired and stored in a directory buffer. A parallel tree structure is used to retrieve directory contents quickly and in a consistent fashion.

25 Claims, 16 Drawing Sheets

(56) References Cited

U.S. PATENT DOCUMENTS

| | | | | |
|---|---|---|---|---|
| 2006/0173873 A1* | 8/2006 | Prompt | ................ | G06F 16/284 |
| | | | | 707/E17.006 |
| 2011/0145200 A1* | 6/2011 | Milby | ................ | G06F 3/0631 |
| | | | | 707/811 |
| 2011/0167221 A1* | 7/2011 | Pangal | ................ | G06F 12/122 |
| | | | | 711/117 |
| 2015/0169515 A1* | 6/2015 | Hagen | ................ | G06F 40/186 |
| | | | | 707/756 |
| 2016/0140354 A1* | 5/2016 | Morris | ................ | G06F 16/188 |
| | | | | 707/785 |
| 2023/0325363 A1* | 10/2023 | Valt | ............... | G06F 16/164 |
| | | | | 707/829 |

OTHER PUBLICATIONS

Landley, R., "What are red-black trees, and what are they for?" dated Jan. 18, 2007, URL: https://www.kernel.org/doc/Documentation/rbtree.txt.

"Write your own file system using fuse under Linux," ProgrammerSought, URL: https://www.programmersought.com/article/512848919/, date found via Google as Nov. 2018.

* cited by examiner

```
struct dirent {
    ino_t           d_ino;       /* Inode number */
    off_t           d_off;       /* Not an offset; demarkation for the next readdir call*/
    unsigned short  d_reclen;    /* Length of this record */
    unsigned char   d_type;      /* Type of file; not supported
                                    by all filesystem types */
    char            d_name[256]; /* Null-terminated filename */
};
```

Cat
In
Hat
Redfish
Bluefish
Onefish

Fig. 4A

METHOD AND SYSTEM TO IMPLEMENT DIRECTORY READS FOR A DATABASE FILE SYSTEM

BACKGROUND

Database Management Systems (DBMS) are used to store data closely associated with database applications. A relational database management system (RDBMS) is a type of database system based on the relational model of data, often storing its data in a collection of database tables that typically use SQL (Structured Query Language) to access the contents of the database tables.

A database file system (DBFS) leverages the features of a Database Management System to implement a file system that store files in the database as the file system's backend. Modern DBMSs and RDBMSs have extensive strengths and capabilities to efficiently manage large volumes of data, which can be used advantageously to manage the extensive amount of data associated with a file system implemented as a DBFS. The DBFS provides a client-server file system abstraction over files stored in a database allowing users to perform network file system operations within the database using standard file system interfaces instead of standard database interfaces. Further details regarding example approaches to implement a DBFS are disclosed in U.S. Pat. Nos. 8,239,486, 9,881,170, and 10,509,773, which are all hereby incorporated by reference in their entirety.

A set of interfaces may be provided for the DBFS that transform file system operation requests from the client to database operation requests that are sent to the DBMS. Retrieving directory content in a database file system involves querying the relevant tables in the DBMS for data associated with the file system operation request. Essentially, the file system request is transformed into a set of SQL statements that are sent and processed by the DBMS to handle and provide a response to the file system operation request.

A significant amount of cost may need to be incurred to query for and retrieve the file content data from the backend database system when processing a file system operation request. Therefore, it is often desirable to cache the file-related data within a buffer/cache that is managed by the DBFS, to avoid excessive costs involved for calls to be made to query the database tables to retrieve relevant rows of data for the file system operation.

The problem addressed by this disclosure is that certain types of file system implementations are not configured to maintain sufficient state to efficiently manage the cache to avoid excessive calls to the backend database. For example, consider standard implementations of NFS (Network File System), where a directory in a DBFS may be exported by NFS to a user device (e.g., as a mounted filesystem). The standard NFS protocol is stateless in which a command to read a directory (e.g., a readdir( ) call) is encapsulated with both an open and a close of a read sequence for a directory (e.g., calls for opendir( ) and releasedir( )). This means that when reading from a large directory that cannot have all of its contents fit into cache at one time, it is very difficult in this circumstance to track the different portions of the directory that have already been processed, since state is not retained for the already-processed files (e.g., based upon the offsets of the already-processed files). This means that excessive amounts of additional and repeated calls to open and release the directory may need to be performed to process additional files in the directory to be provided to the user. This lack of ability to retain state for NFS-related access to directories in a DBFS can lead to latency problems in DBFS systems, and in some cases the latency for a file operation is so extreme that it can be confused as a hang within the system. In addition, the correctness of returned data may be compromised if any offsets within the cache are changed in-between different iterations of content reads from the cache.

What is needed, therefore, is a method and/or system that overcomes these problems. It is noted that the approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Embodiments of the present invention provide a system, method, and computer program product of an improved approach to access the contents of DBFS. Some embodiments implement an approach whereby the DBFS contents are acquired and stored in a directory buffer, and a parallel tree structure is used to retrieve directory contents quickly and in a consistent fashion.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 3 shows an example directory entry structure.

FIGS. 4A-J provide an illustrative of an approach of how a red black tree is generated when a directory with a set files is read for the first time according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

A DBFS permits a user to store user data within a database and to access that data using a file system interface. Embodiments of the present invention provide an improved approach to access the contents of the DBFS which overcomes problems associated with file system protocols that do not retain state for directory accesses. In particular, some embodiments implement an approach whereby the DBFS contents are acquired and stored in a directory buffer, and a parallel tree structure is used to retrieve directory contents quickly and in a consistent fashion.

Figure 1:
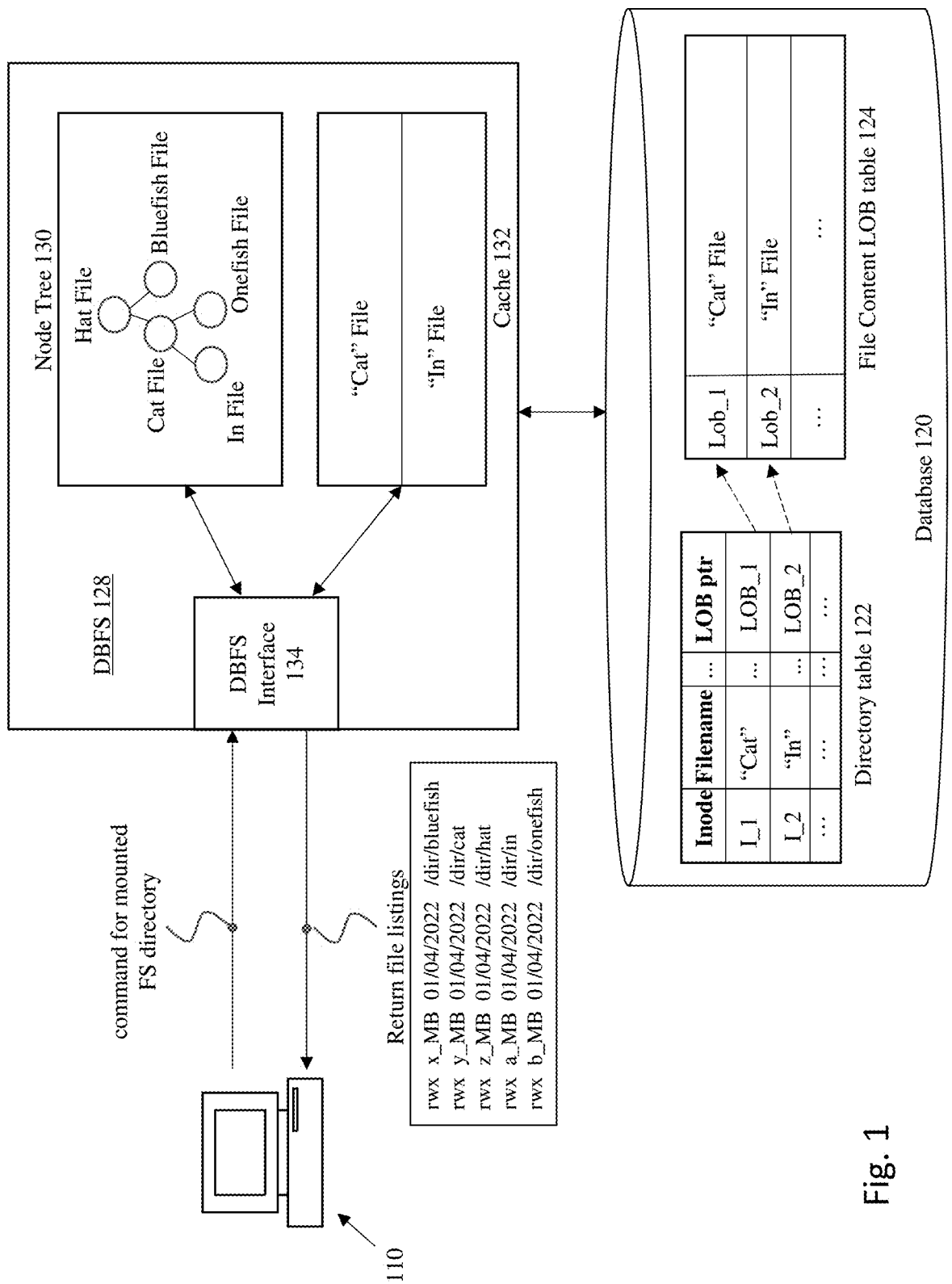
FIG. 1 shows an architecture of a system for implementing some embodiments of the invention to implement a DBFS where data for the DBFS is stored in a database.

FIG. 1 shows an architecture of a system for implementing some embodiments of the invention to implement a DBFS 128 where data for the DBFS is stored in a database 120 which may encompass, include, or be managed by a database management system or DBMS (the terms database and DBMS may be interchangeably used herein depending upon context). A DBFS 128 leverages the features of a database 120 to store files, and the strength of a database to efficiently manage relational data. The DBFS 128 provides a client-server file system abstraction over files stored in a database allowing users to perform network file system operations within the database using standard file system interfaces instead of standard database interfaces. The DBFS 128 provides a transparent abstraction layer of a shared network file system as a local file system to a client user.

Each file in the file system is represented by a separate row in a directory table 122 in the database 120. Columns in the directory table 122 correspond to different items of file metadata associated with each file. The directory table 122 may include a separate column for any item of information related to the file or which may be produced for a file based on a directory listing command (e.g., the "ls" command in Unix-based systems), such as for instance, one or more of the following: (a) inode data; (b) filename; (c) file size; (d) file permissions (such as read, write, execute permissions); and/or (e) creation/modification date/time for the file.

Each row in the directory table 122 may also include a column pertaining to a LOB ("Large Objects") that is used to store the contents of a file. LOBs are a set of datatypes that are designed to hold large amounts of data in a database. Typically, data within a column of a relational database is based upon highly structured data, where each column is defined in the database table's schema to conform to a fixed and well-understood structured data type. However, the contents and size for a file may significantly vary from one file to the next. As a result, a typical column defined for highly structured data may not be appropriate to hold file contents for a DBFS. Instead, a LOB is used to hold the file contents in the current embodiment, where the LOB corresponds to a form of storage in the DB that may be used to hold unstructured data or semi-structured data of varying sizes. A LOB to hold file data for a semi-structured file type may include, for example, data for XML documents. A LOB to hold unstructured data may be used to hold any type of file content, e.g., for data that is not or cannot be broken down into smaller logical structures.

The LOB column in the directory table 122 may include a pointer to the location of the actual LOB that is holding the file contents for a given file. In this scenario, the LOB may be stored in a separate LOB table 124, and the LOB pointer identifies which row in the LOB table 124 corresponds to a given row for a file within the directory table 122. Alternatively, the LOB may be implemented as an inline LOB, in which the data for the LOB (file contents) are stored inline within the LOB column in the directory table 122. The LOB may be implemented as an "internal LOB", where the LOBs are stored inside database tablespaces. The LOB may also be stored as "external LOBs", which are data objects outside of the database, such as operating system files. A LOB locator may be used to reference a LOB. A LOB instance corresponds to a locator and a value, where the LOB locator is a reference to where the LOB value is physically stored, and the LOB value is the data stored in the LOB.

In some embodiments, the DBMS 120 is the file system server for the DBFS 128. A DBFS client provides a set of interfaces that transform file system operation requests from the client to database operation requests, which are then sent to the DBMS 120. The DBFS file system is mounted on a client machine at a client-specific mount point. File system operation requests from a client-user that are relative to the client-specific mount point are translated to their corresponding database operation requests and sent to the DBMS (e.g., at database 120). Before mounting the DBFS file system on the client machine, the DBFS Client authenticates the client-user based on their credentials. Once authorized, the DBMS transmits information for each of the requested files stored in the DBFS file system. This information includes, for example, the file owner, the group, and the permission values originally set by the system where the file was last updated or created.

Similar to a Network File System (NFS), the DBFS provides a transparent abstraction layer of a shared network file system as a local file system to a client user. The DBMS is the file system server for DBFS. A DBFS Client provides a set of interfaces that transform file system operation requests from the client to database operation requests, which are then sent to the DBMS.

When the user at client 110 performs a file operation request on a file stored within the DBFS file system, several operations may occur. The client machine determines whether the client-user has sufficient privileges to perform the requested file operation. This determination is performed by the client machine's operating system. If the client-user at the operating system level does not have permission then the operating system denies the request. If the client-user has sufficient privileges, then the client's operating system passes the request to a DBFS Client. The DBFS Client then translates the client-user's operating system file operation request into a database request. The database request is passed to the DBMS, which performs the database request. The user then receives the output of the database request via the DBMS, and DBFS client.

The DBFS may implement a cache 132 to cache data for directories and files (e.g., metadata for the directory/files and/or file data. As previously explained, the source information is maintained in a table in the backend database 120. To optimize the access to these files, the DBFS provides an intermediary service between the DBFS interface 134 and the backend database 120, where frequently accessed files/file information can be cached and exported. In some embodiments, an exported file system is NFS mounted, e.g., using the LDAP automount feature and made available to view, check-out a file or check-in the changes.

An extremely large number of files may be maintained in the DBFS, e.g., where many millions or billions of files are stored in the backend database 120. Given the potentially large number of files maintained by the DBFS, directory and file access operations for a given directory/file should implemented to be as efficient as possible.

As previously discussed, the problem addressed by this disclosure is that certain types of file system implementations are not configured to maintain sufficient state to efficiently manage the cache to avoid excessive calls to the backend database. For example, consider standard implementations of NFS, where a directory in a DBFS may be exported by NFS to a user device as a mounted filesystem.

When an "ls" operation is performed in a local environment, the following operations are made into the backend file system: (a) Opendiro, (b) readdir( ) until EOF, (c) releasedir( ). The total number of elements in a directory is not known until all the directory entries are retrieved.

In a non-optimal approach to implement this operation, the first readdir( ) call on a directory will allocate a buffer in cache 132 to hold the directory entries. That buffer will hold up to a certain amount of directory entries in it. When a new directory entry is retrieved, it is saved in the buffer but if it does not fit, a bigger buffer will be allocated to hold all the information and the information will be copied into that buffer, releasing the previous buffer. This process is repeated until all the required information is stored in memory. Once all the directory entries are retrieved and stored in a buffer, then a reply to the OS is sent with the required information from the buffer. A file handle/directory offset is sent with the request so the OS knows the next directory entry that should be returned to the client. The subsequent readdir( ) request from the client will have this file handle/readdir offset so the directory entries will not get duplicated or omitted. The issue with this approach is that the DBFS may store a very large number of files in a directory that is often exported using NFS. The NFS protocol is stateless in which all readdir( ) requests are encapsulated with an opendir( ) and releasedir( ) call. Since this implementation reads the entire directory content in a buffer and sends the data in multiple iterations with offset into the buffer as a directory offset/file handle for subsequent readdir call, correctness of the returned data may be compromised. The buffer offset can point to a completely different entry if the directory got updated between readdir calls. Even worse, since each directory entry may not be of the same size, if a new directory entry gets created, the buffer offset might point to the middle of some other entry. In addition, latency issues may occur with the need to perform repeated opendir( ) and releasedir( ) calls for large directories.

To address these problems, embodiments of the invention implement an approach whereby the DBFS contents are acquired and stored in a directory buffer in cache 132, and a parallel tree structure 130 is used to retrieve directory contents quickly and in a consistent fashion. According to some embodiments, the node tree 130 is implemented as a Red Black Tree (RBT) to store all the entries in the directory. A RBT is a type of self-balancing binary search tree, where each node in the tree represents a "color" (such as red or black) to assist in maintaining the balancing of the tree during insertions and deletions from the tree. When the tree is modified, the new version of the tree is rearranged and repainted to restore the coloring properties that constrain how balanced/unbalanced the tree can become. Here, the RBT includes nodes that correspond to files within a directory in the DBFS. The node for a given file may include a key and an offset for that file, where a respective portion of the buffer for that file is essentially referred by that node.

By providing the node tree 130, this permits the DBFS 128 to identify the files and certain properties of the files within a given directory by accessing the node tree 130, where a directory listing command is implemented by walking through the nodes of the node tree 130. This means that the DBFS does not need to rely solely upon information for files in a buffer within cache 132 to identify properties such as offsets for files in the buffer, which may become incorrect over time or where NFS-related state is not retained. Instead, the DBFS 130 can operate by walking through the node tree 130 to identify files to return to the client in any given tranche of file content that is currently held in the buffer, and when that tranche of files is done, the DBFS can then walk through another section of the tree for the next tranche of files to return to the client. This approach therefore always provides a consistent view of the directory by walking through the same tree each time, regardless of the possible inconsistencies that may end up existing in the buffer, and will avoid additional repeated directory open/close sequences due to lost NFS-related states since the portion of the tree that was previously walked can be tracked to identify the next part of the tree to walk.

While a RBT is described herein with regards to an illustrative embodiment, it is noted that other types of structures may also be used in various other implementations of the invention, and thus the invention is not to be limited in its application only to RBTs unless expressly claimed as such.

Figure 2:
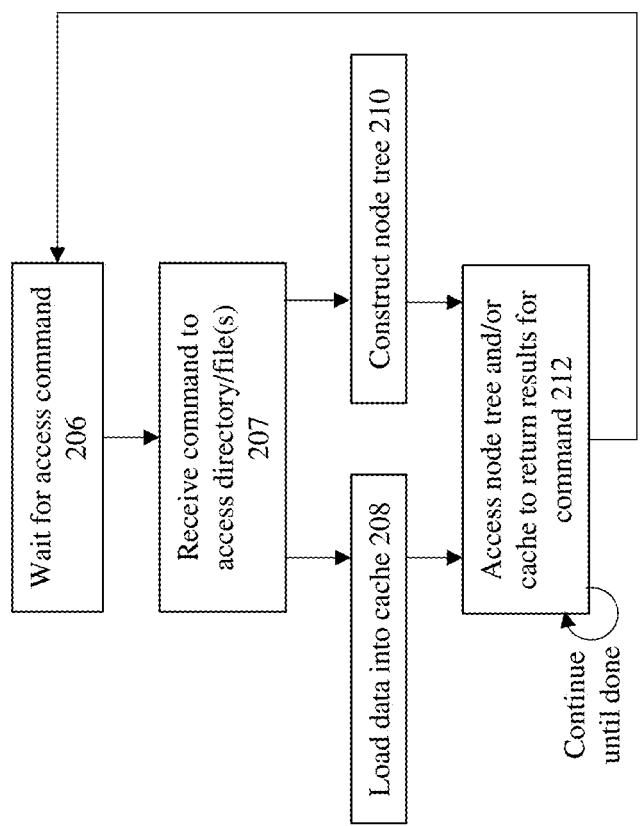
FIG. 2 shows a flowchart of an approach to implement some embodiments of the invention.

FIG. 2 shows a flowchart of an approach to implement some embodiments of the invention. At 206, the system waits for a file system command to be sent from a client to access the DBFS. At 207, a file system command is received for processing. Any suitable type of file system command may be processed according to various embodiments of the invention, such as commands to list the files in a given directory of the file system (e.g., such as the Unix-based 1s command).

A directory object in most Unix file systems is represented by an inode structure and the files created under the directory are stored inside a list of blocks allocated for the directory object. When a directory read is performed, the blocks from a directory object are read and returned to the caller. If a new file is created under the directory, a new entry is allocated, and the details of the file are stored inside it. Similarly, when a file is deleted the corresponding entry is marked as free.

A typical readdir operation returns a pointer to the directory entry structure. An example directory entry structure 302 is shown in FIG. 3, which includes values in the structure such as an inode number, record length, file type, filename, and offset. The offset value can be used to mark the location for the subsequent readdir call. Note that the entire directory content might not be read in one readdir call and thus readdir returns an offset to indicate where the reading should resume from in the next call. Also, one or more readdir calls may be encapsulated between an openddir and a releasedir call.

At 208, when a directory read operation is performed, the backend filesystem will be accessed to return the directory contents and will cache this result for subsequent requests. As discussed above, the backend filesystem represents directories and files as rows in a table. The columns in this table will have information like file type, inode number, atime, mtime, ctime and a pointer to the actual LOB location. To retrieve the directory contents, the backend filesystem will query the table and return the rows with a parent inode that is the same as the inode of the directory object.

The directory cache (dir_cache) is used to hold file metadata, and is maintained per directory object and is not tied to a specific request. A request specific structure for a directory buffer (dir_buf) can be used, and this structure is passed back as a response to the read request. This directory buffer is part of a directory context structure (dir_ctx). Upon a read request, if dir_cache is present and valid, contents are copied from dir_cache to dir_buf based on the number of bytes requested by the user. If dir_cache is not present or invalid, it is populated by reading the directory contents from the backend filesystem and the processing then proceeds with the copy. On releasedir, the dir_cache may then be freed in some embodiments.

Along with dir_buf, an offset is returned as well. This offset marks where in dir_cache to start copying from for the next read request. This works well when the number of files in a directory is relatively small and the directory itself is not changing in the middle of a read. When readdir requests are received from an NFS client, as the NFS protocol is stateless, each readdir call is preceded by an opendir and the offset returned by the previous readdir call is used for the next readdir call. These steps work well so long as the directory contents do not change. When a node is added or deleted in the directory, then the offset may point to an incorrect location (e.g., the middle of a record) causing correctness issue. If there is a directory content change, then the directory buffer will get refilled with the new contents of the directory. When a subsequent readdir call comes with an offset from the previous incarnation, this can point to a completely different directory entry or even worse it can point to middle of a directory entry resulting in a corrupted readdir output. Unlike a directory read on a local mount where all the records are fetched in one go, opendir→readdir→readdir→releasedir, NFS issues readdir calls encapsulated with opendir and releasedir calls. Any change in directory content can result in an output that doesn't map correctly to dirent structure. In addition to returning an incorrect value, the directory read is performed multiple times to the back-end file system—finding the rows in the table as a result of the multiple releasedir( ) calls. Therefore, as discussed further in the document, a RBT tree is created and used in conjunction with the buffer to address these problems.

At step 210, along with maintaining a dir_cache per directory object, a Red Black Tree (RBT) will also be constructed for the directory object. The RBT will serve as a layer of indirection to access the dir_cache and will ensure correctness. A directory object is just another type of node in the tree. Each node in the file system is represented using the tree structure.

At step 212, the node tree is used in conjunction with the buffer to respond to the file system command. This approach improves the performance of generating a directory listing in both local and NFS environments. When a directory with a large number of entries is listed, the readdir call returns a file handle/offset which corresponds to the last node that was returned in the call. The subsequent readdir call made by the client with the returned offset should be able to find the rest of the elements in the directory without running into any error. This should work for both the cases where a new file got created and when an existing file is deleted By implementing a RBT to represent the entries in the directory, the subsequent reads on the directory can simply traverse the tree and return the node entries instead of rereading the entire directory again. To help performance of repeated reads of the directory, the RBT with all the directory entries should not be deleted on the release of the directory request, but can instead be deleted when there are changes on the directory or based upon a timeout threshold that is established. Since the semantics of the readdir operation only requires a consistent view in the time between the opendir and releasedir calls, the invalidation of the cache upon a change in the directory can be deferred if a client is currently performing a readdir.

In some embodiments, the step 208 to populate the cache may be configured to be populated at a particular point in time. Instead of populating it at the first readdir call, the dir_cache will be populated on the opendir call and the RBT will be constructed alongside it. In some embodiments, both of these will not be freed on releasedir but will continue to be maintained until a request (to release or forget) is sent or after a designated time period has elapsed.

Some embodiments may implement a fallback mechanism to revert back to an implementation that does not use a red black tree. For the fallback mechanism, a mount option may be implemented, where if this option is specified during mount time, the readdir implementation falls back to the approach without the RBT.

This document will now describe an approach to implement a RBT. In general, the RBT is constructed such that, as new file entries are added, the tree is balanced so that the height of any child node is no more than twice the height of the shortest node. This may add extra memory allocations to maintain the RBT, but provides the benefit of not having to reread the directory content on each readdir call when it is encapsulated with opendir and releasedir calls which can outweigh the cost of the additional memory usage.

A dispatcher function is called when a request to open a directory is received, which invokes a file system specific callback function. This function is used to create a red black tree as part of populating the dir_cache. By populating and saving the dir_cache, every opendir does not result in a backend call to read the directory contents. If the dir_cache was already allocated and populated and it did not get invalidated due to a change in the directory, the current readdir request will get satisfied from the existing dir_cache.

Figure 4A:
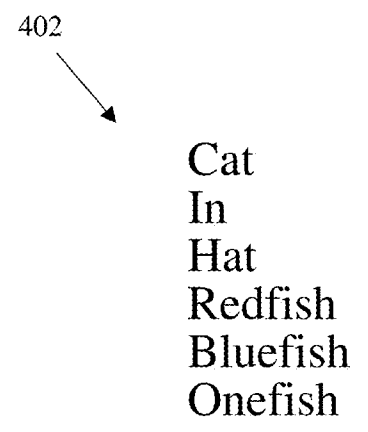
Figure 4B:
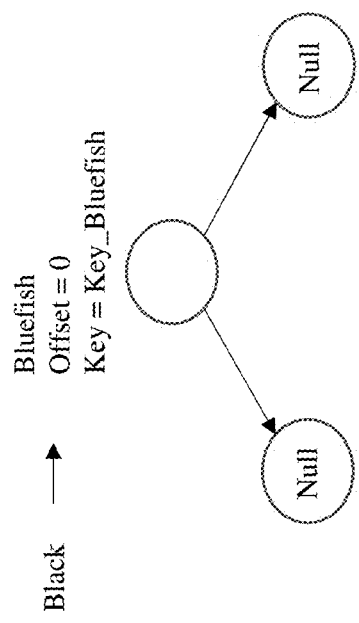

FIGS. 4A-J provide an illustrative of an approach of how a RBT is generated when a directory with a set files is read for the first time according to some embodiments of the invention. Shown in FIG. 4A is a list 402 of files in an example directory, including files named (a) "Cat", (b) "In"; (c) "Hat"; (d) "Redfish"; (e) "Bluefish"; and (f) "Onefish". A mount point in a file system can be populated with these files.

As shown in FIG. 4B, assume that the backend filesystem in the DBFS returns the first entry "Bluefish". At this point, a new node is created that corresponds to the Bluefish file. In this example, the file name Bluefish is hashed and a key ("Key_Bluefish") is generated. The key corresponds to a deterministic value that uniquely corresponds to a given file. For readability purposes, the key in this example is expressed as "Key_Bluefish". It is noted, however, that a real-world example may actually generate a key such as "0xe1eddc37" for this file. The file metadata contents for this file entry are also copied into the dir_cache at this point. The file metadata contents are copied to the cache at offset 0. This information is recorded in the RBT node. This node is currently colored with the Black color.

It is noted that the RBT root node can be represented using a different structure than a regular RBT node and differs in the sense that it is the only node in the RBT that will contain access time information.

Figure 4C:
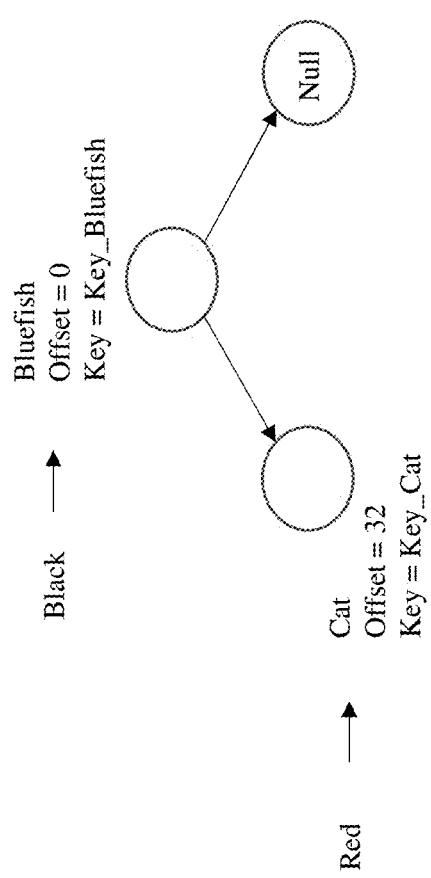

FIG. 4C shows the status of the RBT after the second entry for "Cat" is received. A node is created that corresponds to the Cat file. The file name Cat is hashed and a key ("Key_Cat") is generated. The file contents for this file entry are associated with an offset of 32. This information is recorded in the RBT node that corresponds to the Cat entry. This node is currently colored with the Red color.

Figure 4D:
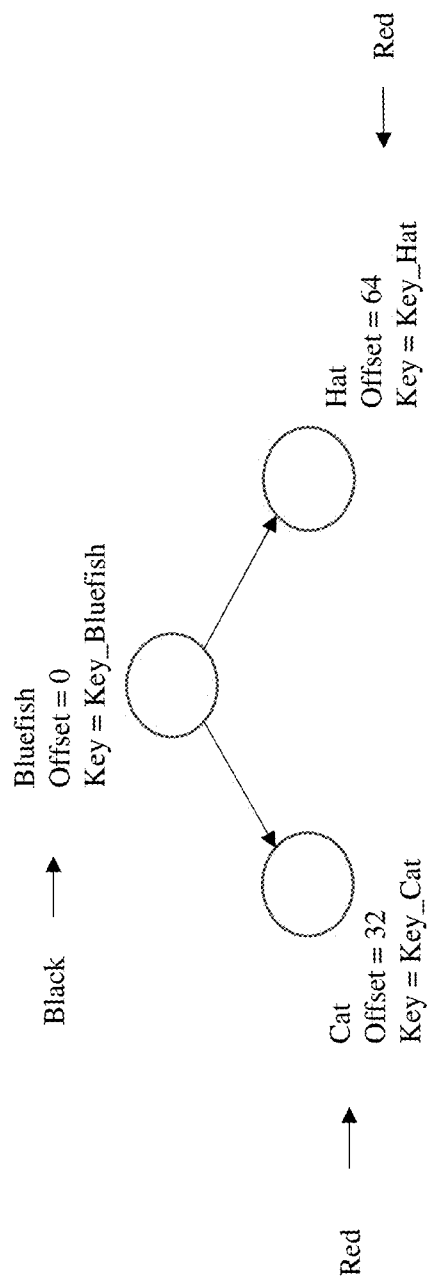

FIG. 4D shows the status of the RBT after the third entry for "Hat" is received. A node is created that corresponds to the Hat file. The file name Hat is hashed and a key ("Key_Hat") is generated. The file contents for this file entry are associated with an offset of 64. This information is recorded in the RBT node that corresponds to the Hat entry. This node is currently colored with the Red color.

Figure 4E:
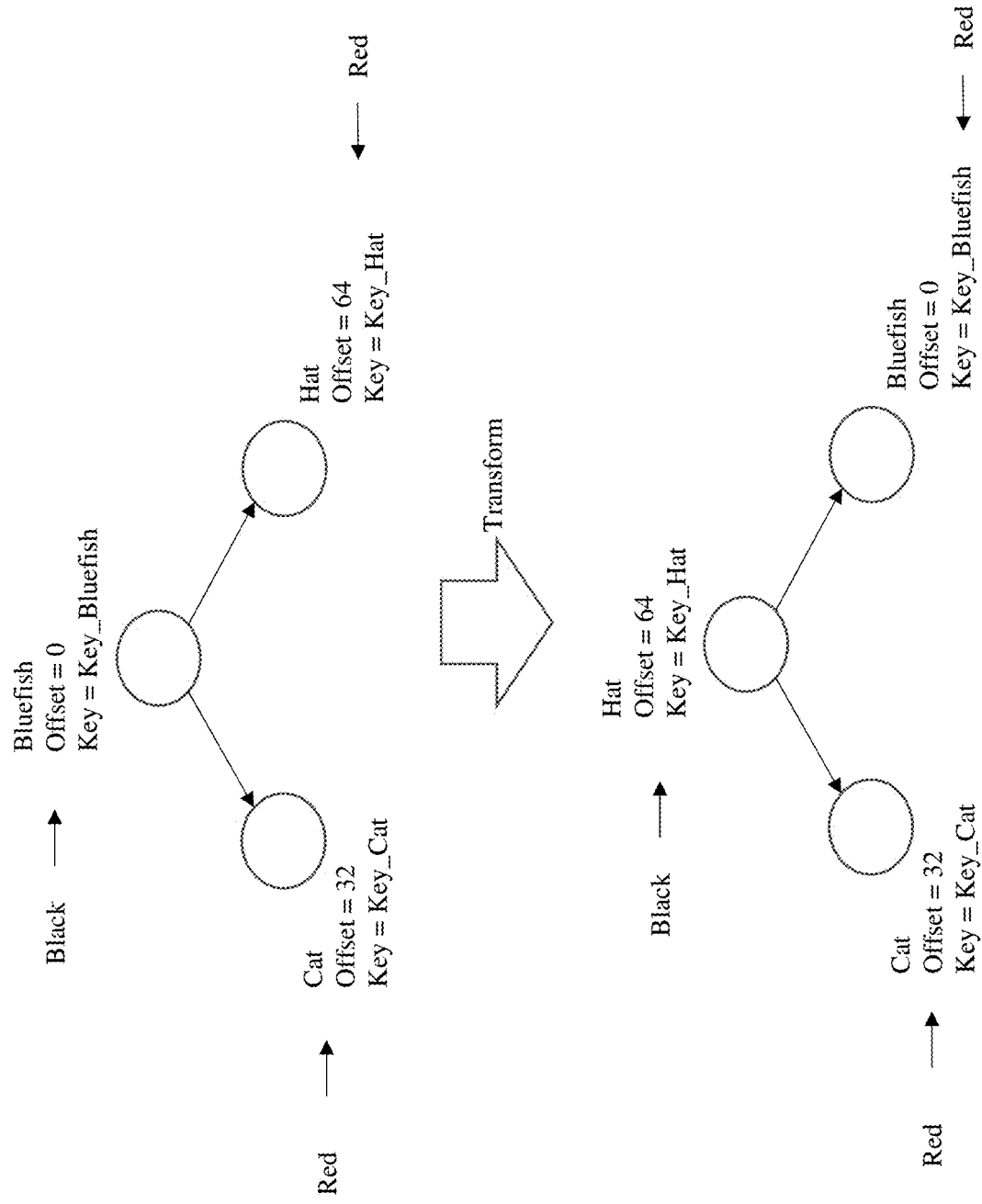

After inserting the node for Hat, the tree is transformed to adhere to the properties of a RB tree. An example transformation is shown in FIG. 4E. Here, it can be seen that the Hat entry is now at the root node. The Cat entry remains as the left-hand side child node from the Hat node. However, the right-hand side child node is now the node for the Bluefish entry.

Figure 4F:
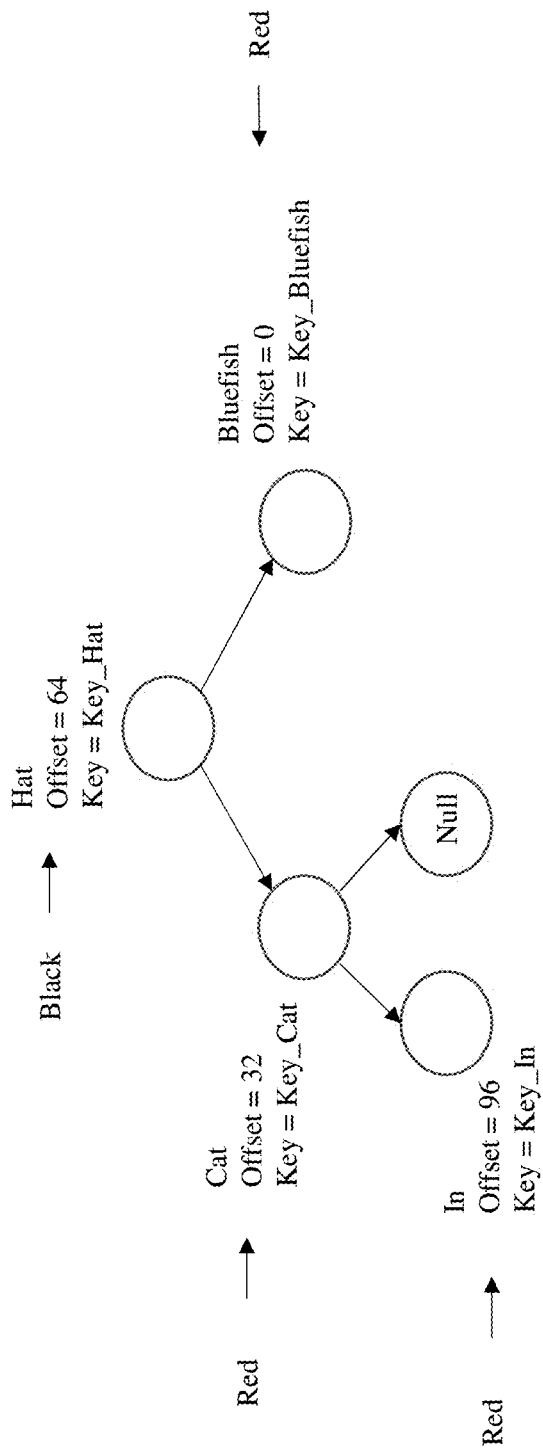

Next, as shown in FIG. 4F, the entry for "In" is received. A node is created that corresponds to the "In" file. The file name "In" is hashed and a key ("Key_In") is generated. The file contents for this file entry are associated with an offset of 96. This information is recorded in the RBT node that corresponds to the In entry. This node is currently colored with the Red color.

Figure 4G:
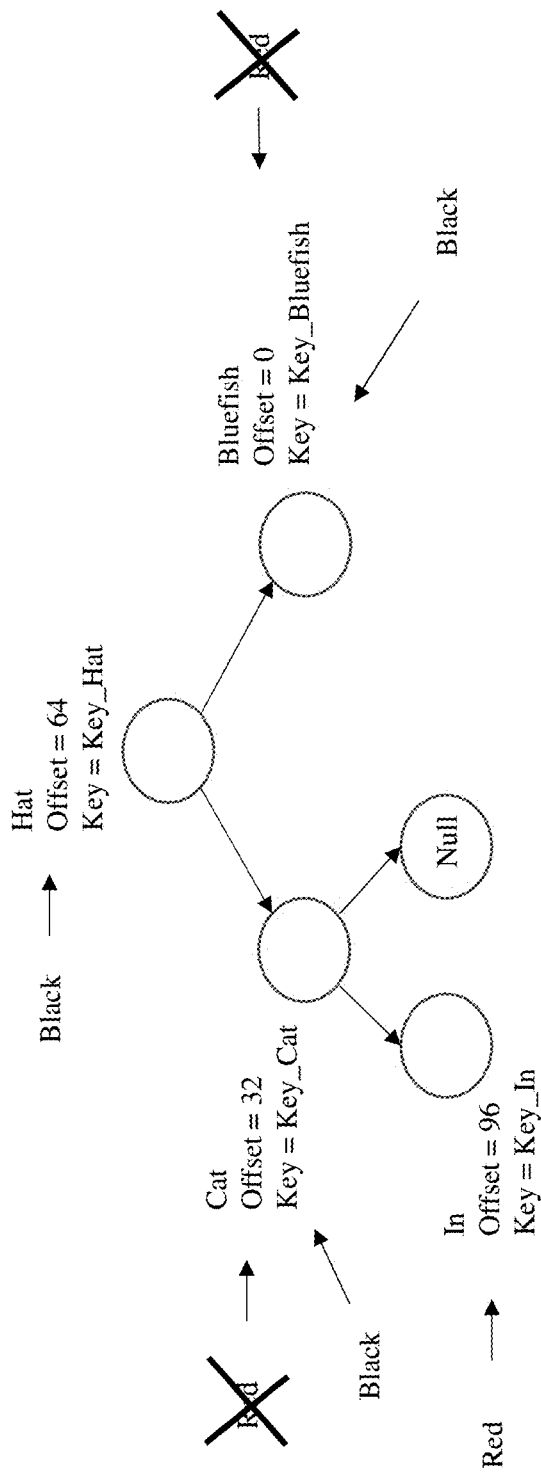

At this point, another transformation occurs. As shown in FIG. 4G, the transformation changes the red color of the Cat node to black. Similarly, the transformation will also change the red color of the Bluefish entry to Black.

Figure 4H:
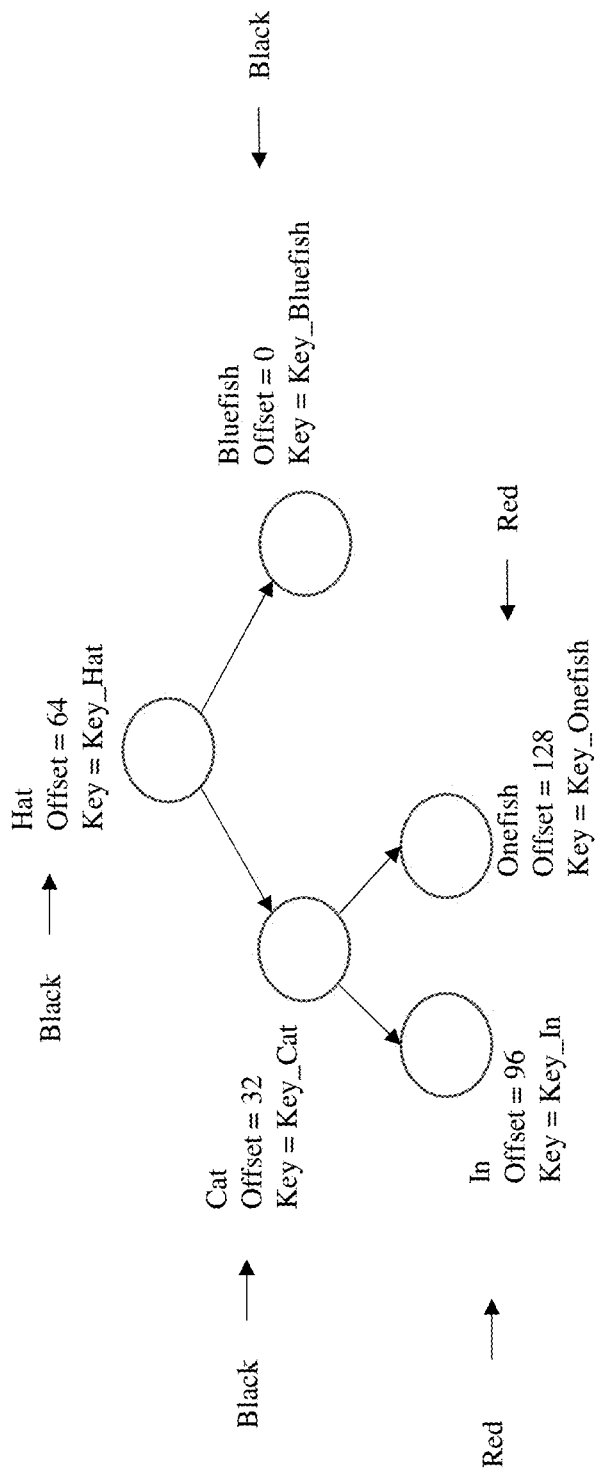

As shown in FIG. 4H, the entry for "Onefish" is received. A node is created that corresponds to the "Onefish" file. The file name "Onefish" is hashed and a key ("Key_Onefish") is generated. The file contents for this file entry are associated with an offset of 128. This information is recorded in the RBT node that corresponds to the Onefish entry. This node is currently colored with the Red color.

Figure 4I:
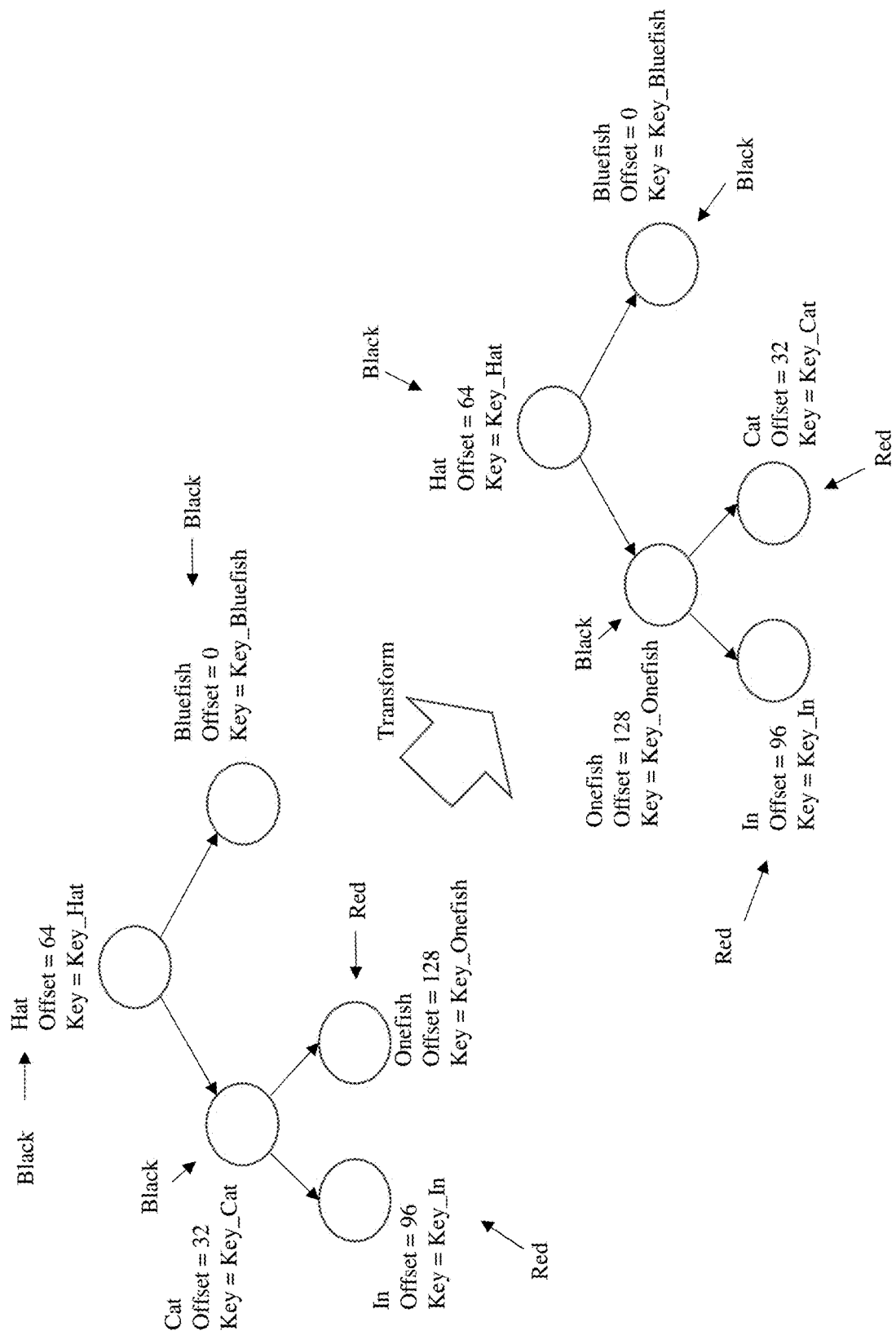

After inserting the node for Onefish, the tree is transformed to adhere to the properties of the RB tree. An example transformation is shown in FIG. 4I. Here, it can be seen that the Onefish entry is now the left-hand side child node from the Hat node. The Cat entry is now the right-hand side child node from the Cat node.

Figure 4J:
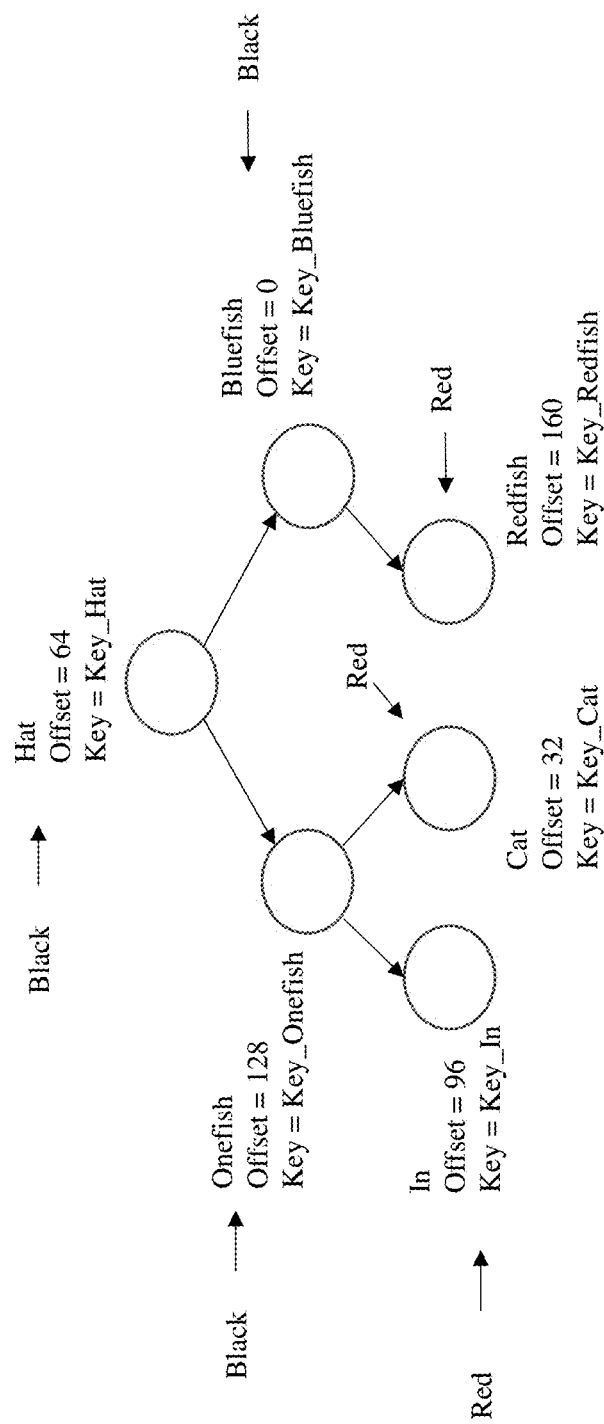

Next, at FIG. 4J, the entry for "Redfish" is received. A node is created that corresponds to the "Redfish" file. The file name "Redfish" is hashed and a key ("Key_Redfish") is generated. The file contents for this file entry are associated with an offset of 160. This information is recorded in the RBT node that corresponds to the Redfish entry.

At this point, the RBT for the directory is now complete. As can be seen in this example, during node insertion, the tree is self-adjusting according to the properties of the RB tree based on the incoming entries key value and the color of the nodes in the tree. This keeps the height of the tree meaningfully balanced. Any lookup later based on key value continues based on where the previous readdir stopped.

Figure 5:
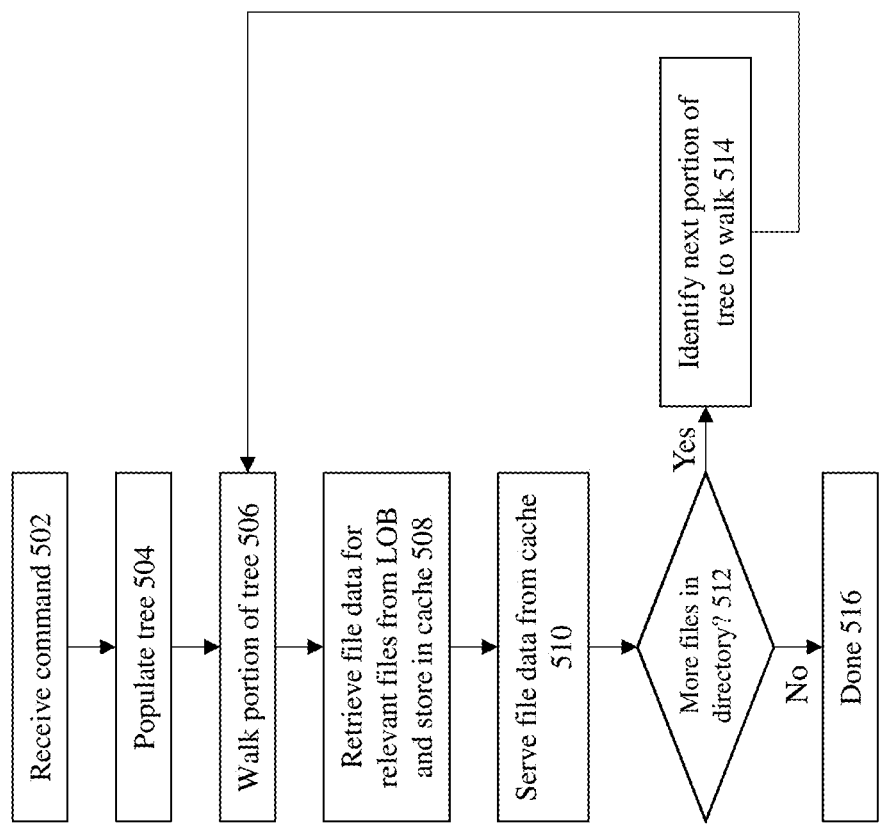
FIG. 5 shows a flowchart regarding an approach to use the RBT tree to efficiently implement a file system command.

FIG. 5 shows a flowchart regarding an approach to use the RBT tree to efficiently implement a file system command. At 502, a file system command is received for processing at the DBFS. At 504, the RBT is populated, e.g., as illustrated in FIGS. 4A-J.

At 506, a first portion of the node tree is walked as part of the process to handle the file system command. At the same time, at 508, the pertinent entries for file content is retrieved from the database and held within the buffer. To implement his processing, the RBT tree nodes can be searched using a key that is based on file name. In addition, the tree also stores the offset in the directory buffer where the file entry is recorded. By returning the (key+1) to the readdir call, one can easily search the RBTree for the next entry, and at 510, return the file contents from its respective location in the buffer.

At 512, a determination is made whether there are additional files in the directory to process. This check is performed since, due to the limited size of the buffer, it is possible that only a subset of the files fit within the buffer in a previous iteration of processing.

If it is determined that there are additional files to process, then at 514, the system will identify the next portion of the tree to walk to process the files. This is performed by identifying stopping point for the last walk of the tree, and to continue from that last position in the tree. The process will then return back to step 506 to repeat the above processing until there are no further portions of the tree to process. At this point, at step 516, the processing has concluded.

Since the offset is stored inside the RBT node, it always points to a complete record. If the directory is changed between subsequent reads, we can still find the correct entry in the directory list and return the values.

Therefore, this solution resolves the above-mentioned issues and improves file system performance based at least upon the usage and implementation of the Red Black Tree. By capturing each file in the directory as a RBTree node, repeated reads of the directory can be served from the directory buffer in OFS node cache without going back to the database object(table). O(log(n)) insert and search time guarantee provided by RBTree allows directory reads to be performed in a very efficient manner.

As noted above, the RBT tree nodes can be searched using a key that is based on file name, and where the offset for the file is stored in the directory buffer where the file entry is recorded. By returning the (key+1) to the readdir call, this permits the system to very effectively search the RBTree for the next entry and return the contents. Since the offset is stored inside the RBT node, it always points to a complete record. If the directory is changed between subsequent reads, the system can still find the correct entry in the directory list and return the values.

Numerous advantages are provided by embodiments of the invention. For instance, lowered latency and improved speed is provided for access to directory contents. In addition, repeated access to the directory will not involve repeated calls to the database code. Furthermore, concurrent calls to read a directory do not need to consume additional redundant overhead. The current approach also provides the ability to retrieve consistent dataset even in the midst of changes to the directory.

System Architecture Overview

Figure 6:
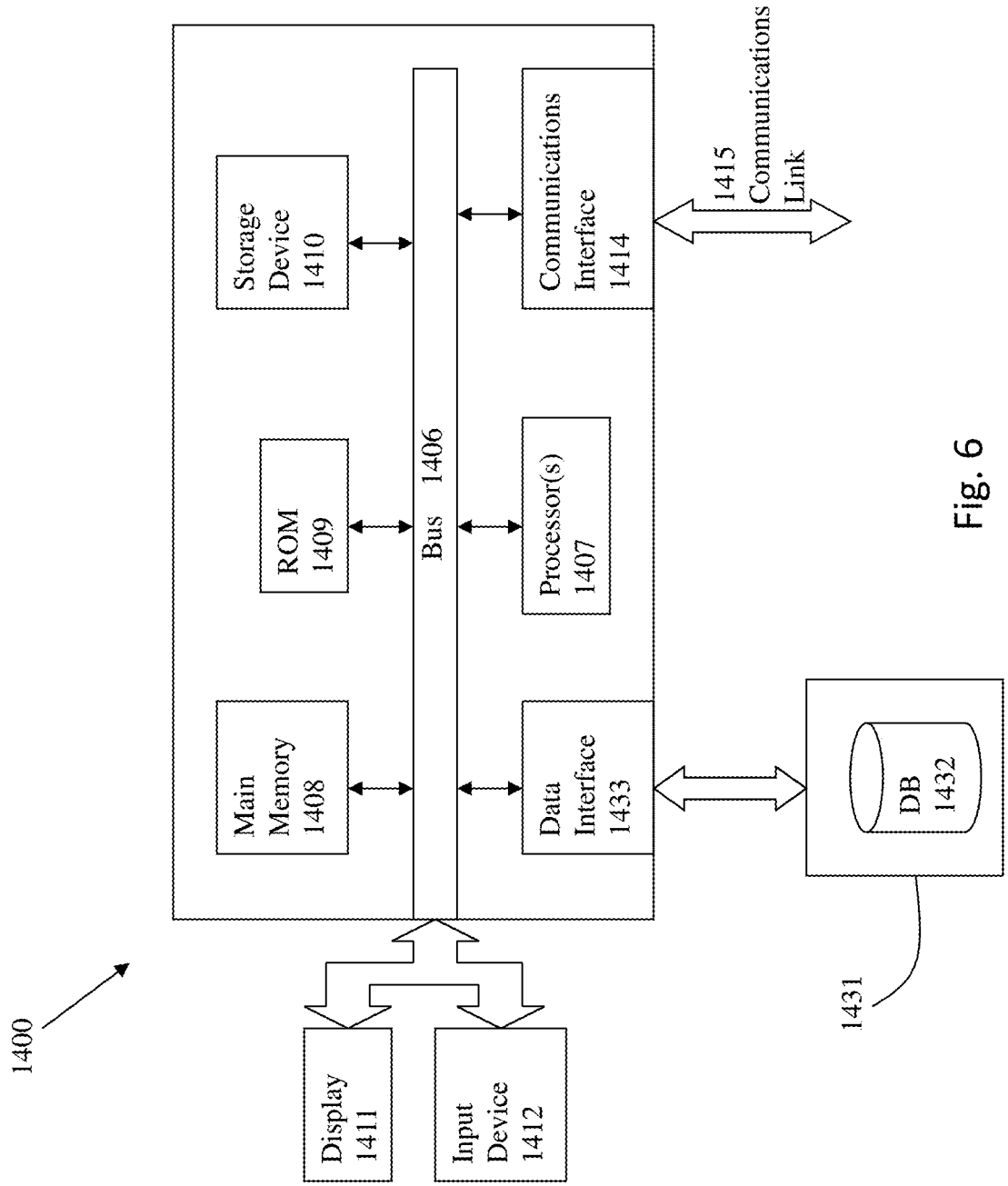
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface

1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 7:
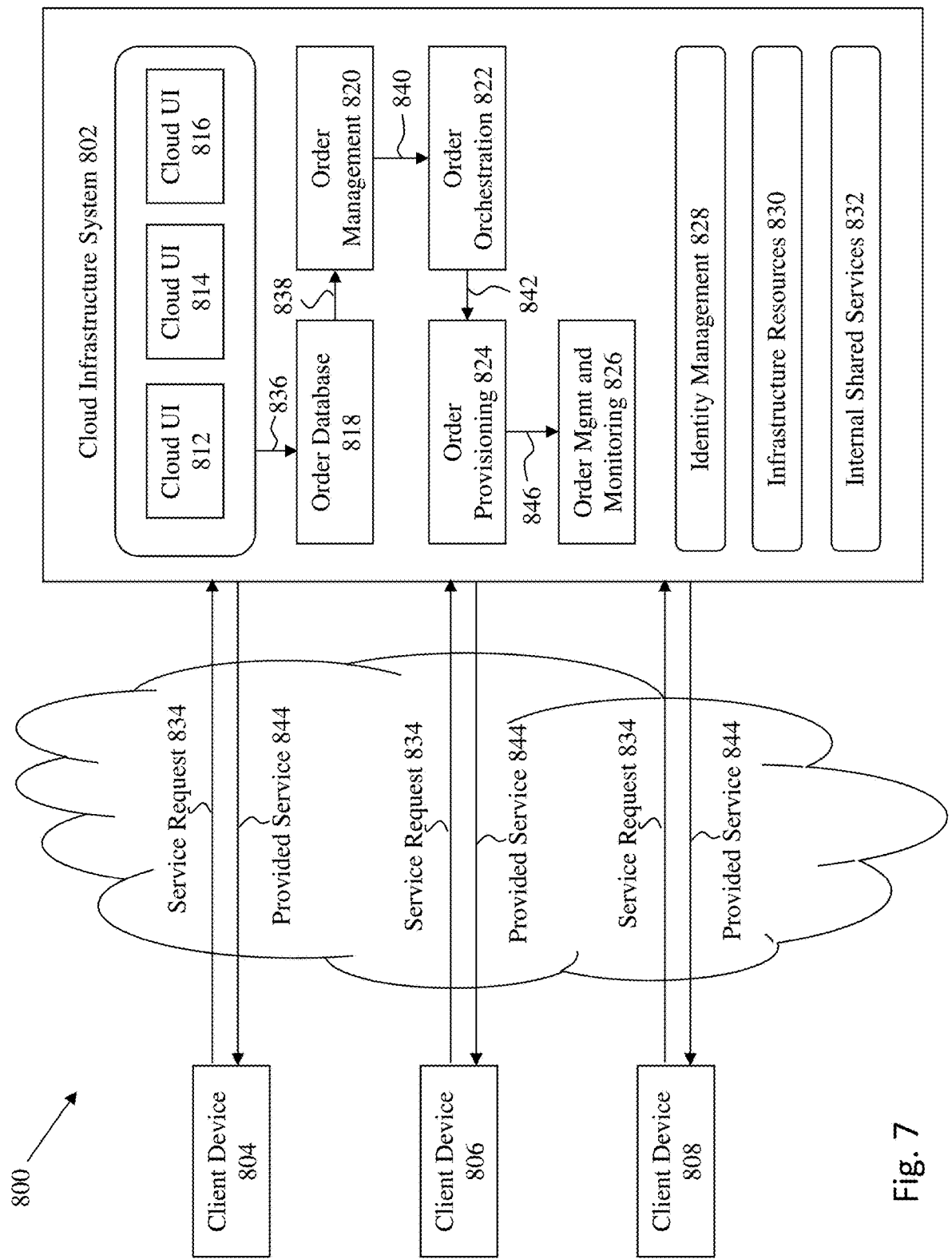
FIG. 7 is a block diagram of one or more components of a system environment in which services may be offered as cloud services, in accordance with an embodiment of the present invention.

FIG. 7 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 6. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
    implementing a database file system (DBFS) where a plurality of files in a file system are stored in a database backend;
    receiving a first file system command to access a directory in the DBFS, the directory having multiple files of the plurality of files in the file system;
    constructing a node tree for the multiple files in the directory in response to the first file system command, wherein the node tree is constructed based on a table for the directory in the database backend having columns that hold metadata associated with the files;
    loading file contents for the files in the directory into a cache in response to the first file system command to access the directory, wherein the node tree references the file contents for the files in the cache;
    receiving a second file system command to access a file of the multiple files in the directory; and
    accessing, in response to the second file system command, the previously constructed node tree to identify file contents of the file in the cache based on a reference to the file contents for the file in the node tree.

2. The method of claim 1, wherein the node tree is constructed as a red black tree.

3. The method of claim 1, wherein an individual row in the table in the database backend corresponds to a specific file, and the individual row corresponds to a LOB that holds file content for the file.

4. The method of claim 3, wherein the individual row comprises a pointer to a location for the LOB located outside of the table.

5. The method of claim 1, wherein the DBFS provides an abstraction layer that is embodied as a mounted file system at a client location, and where the first file system command is translated into a database operation request that is processed at the database backend to handle the first file system command.

6. The method of claim 1, wherein the node tree comprises nodes that correspond to the files in the directory, and where an individual node comprises a key and an offset associated with a specific file.

7. The method of claim 6, wherein the file contents are loaded into a buffer in the cache and the offset is used to reference a location in the buffer for file system content for the specific file.

8. The method of claim 1, wherein the node tree is walked to process the first file system command, wherein an iterative approach is taken to walk different portions of the node tree to process different subsets of the directory to implement the first file system command.

9. The method of claim 1, wherein the node tree is not deleted until after a change to the directory or after a timeout threshold has been reached.

10. A system, comprising:
a processor;
a memory for storing a set of instructions; and
wherein the a set of instructions, when executed by the processor cause a set of acts, the set of acts comprise: implementing a database file system (DBFS) where a plurality of files in a file system are stored in a database backend; receiving a first file system command to access a directory in the DBFS, the directory having multiple files of the plurality of files in the file system; constructing a node tree for the multiple files in the directory in response to the first file system command, wherein the node tree is constructed based on a table for the directory in the database backend having columns that hold metadata associated with the files; loading file contents for the files in the directory into a cache in response to the first file system command to access the directory, wherein the node tree references the file contents for the files in the cache; receiving a second file system command to access a file of the multiple files in the directory; and accessing, in response to the second file system command, the previously constructed node tree to identify file contents of the file in the cache based on a reference to the file contents for the file in the node tree.

11. The system of claim 10, wherein the node tree is constructed as a red black tree.

12. The system of claim 10, wherein an individual row in the table in the database backend corresponds to a specific file, and the individual row corresponds to a LOB that holds file content for the file.

13. The system of claim 12, wherein the individual row comprises a pointer to a location for the LOB located outside of the table.

14. The system of claim 10, wherein the DBFS provides an abstraction layer that is embodied as a mounted file system at a client location, and where the first file system command is translated into a database operation request that is processed at the database backend to handle the first file system command.

15. The system of claim 10, wherein the node tree comprises nodes that correspond to the files in the directory, and where an individual node comprises a key and an offset associated with a specific file.

16. The system of claim 15, wherein the file contents are loaded into a buffer in the cache and the offset is used to reference a location in the buffer for file system content for the specific file.

17. The system of claim 10, wherein the node tree is walked to process the first file system command, wherein an iterative approach is taken to walk different portions of the node tree to process different subsets of the directory to implement the first file system command.

18. A computer program product embodied on a non-transitory computer readable medium having stored thereon a sequence of instructions which, when executed by a processor, performs:
implementing a database file system (DBFS) where a plurality of files in a file system are stored in a database backend;
receiving a first file system command to access a directory in the DBFS, the directory having multiple files of the plurality of files in the file system;
constructing a node tree for the multiple files in the directory in response to the first file system command, wherein the node tree is constructed based on a table for the directory in the database backend having columns that hold metadata associated with the files;
loading file contents for the files in the directory into a cache in response to the first file system command to access the directory, wherein the node tree references the file contents for the files in the cache;
receiving a second file system command to access a file of the multiple files in the directory; and
accessing, in response to the second file system command, the previously constructed node tree to identify file contents of the file in the cache based on a reference to the file contents for the file in the node tree.

19. The computer program product of claim 18, wherein the node tree is constructed as a red black tree.

20. The computer program product of claim 18, wherein an individual row in the table in the database backend corresponds to a specific file, and the individual row corresponds to a LOB that holds file content for the file.

21. The computer program product of claim 20, wherein the individual row comprises a pointer to a location for the LOB located outside of the table.

22. The computer program product of claim 18, wherein the DBFS provides an abstraction layer that is embodied as a mounted file system at a client location, and where the first file system command is translated into a database operation request that is processed at the database backend to handle the first file system command.

23. The computer program product of claim 18, wherein the node tree comprises nodes that correspond to the files in the directory, and where an individual node comprises a key and an offset associated with a specific file.

24. The computer program product of claim 23, wherein the file contents are loaded into a buffer in the cache and the offset is used to reference a location in the buffer for file system content for the specific file.

25. The computer program product of claim 18, wherein the node tree is walked to process the first file system command, wherein an iterative approach is taken to walk different portions of the node tree to process different subsets of the directory to implement the first file system command.

* * * * *

UNITED STATES PATENT AND TRADEMARK OFFICE
CERTIFICATE OF CORRECTION

| | |
|---|---|
| PATENT NO. | : 12,001,406 B2 |
| APPLICATION NO. | : 17/877689 |
| DATED | : June 4, 2024 |
| INVENTOR(S) | : Susairaj et al. |

It is certified that error appears in the above-identified patent and that said Letters Patent is hereby corrected as shown below:

In the Specification

In Column 4, Line 65, delete "data." and insert -- data). --, therefor.

In Column 5, Line 20, delete ""Is"" and insert -- "ls" --, therefor.

In Column 5, Line 22, delete "Opendiro," and insert -- Opendir(), --, therefor.

In Column 6, Line 43, delete "1s" and insert -- ls --, therefor.

In Column 6, Line 62, delete "openddir" and insert -- opendir --, therefor.

In Column 7, Line 67, delete "deleted" and insert -- deleted. --, therefor.

In Column 12, Line 63, delete "cloudservices" and insert -- cloud services --, therefor.

In Column 14, Line 1, delete "cloudservices" and insert -- cloud services --, therefor.

In the Claims

In Column 17, Line 18, in Claim 10, delete "the a" and insert -- a --, therefor.

Signed and Sealed this
First Day of October, 2024

Katherine Kelly Vidal
*Director of the United States Patent and Trademark Office*